US010323331B2

(12) United States Patent
Chung et al.

(10) Patent No.: US 10,323,331 B2
(45) Date of Patent: Jun. 18, 2019

(54) VALUABLE METAL SELECTIVELY ADSORBING ELECTRODE AND METHOD FOR SELECTIVELY RECOVERING VALUABLE METALS

(71) Applicant: INDUSTRIAL TECHNOLOGY RESEARCH INSTITUTE, Hsinchu (TW)

(72) Inventors: Li-Ching Chung, Changhua (TW); Chia-Heng Yen, Kaohsiung (TW); Teh-Ming Liang, Tainan (TW); Ren-Yang Horng, Hsinchu (TW); Min-Chao Chang, Hsinchu (TW); Hsin Shao, Zhubei (TW); Po-I Liu, Kaohsiung (TW); Chih-Hsiang Fang, Puzi (TW); Yin-Lung Han, Tainan (TW); Kai-Chun Fan, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/394,330

(22) Filed: Dec. 29, 2016

(65) Prior Publication Data
US 2018/0187320 A1 Jul. 5, 2018

(51) Int. Cl.
*C25C 7/00* (2006.01)
*C25C 1/00* (2006.01)
(Continued)

(52) U.S. Cl.
CPC .............. *C25C 7/02* (2013.01); *C02F 1/4691* (2013.01); *C02F 3/005* (2013.01); *C25C 1/20* (2013.01);
(Continued)

(58) Field of Classification Search
CPC .... C25C 7/00; C25C 1/00; C25C 7/02; C25B 11/00; C25B 11/12; C25B 9/00; C25B 9/06
(Continued)

(56) References Cited

U.S. PATENT DOCUMENTS 5,158,603 A 10/1992 Stierman et al.
5,882,502 A * 3/1999 Gomez .................. C22B 3/045
204/222

(Continued)

FOREIGN PATENT DOCUMENTS

CN 1557999 A 12/2004
CN 101344522 B 3/2013
(Continued)

OTHER PUBLICATIONS

Taiwanese Office Action and Search Report, dated Aug. 8, 2017, for Taiwanese Application No. 105143830.
(Continued)

*Primary Examiner* — Zulmariam Mendez
(74) *Attorney, Agent, or Firm* — Birch, Stewart, Kolasch & Birch, LLP

(57) ABSTRACT

The present disclosure provides a valuable metal selectively adsorbing electrode, including: an electrode formed by a carbon-containing material; and a protein of a bacterium of genus *Tepidimonas* immobilized on the electrode formed by a carbon-containing material to form the valuable metal selectively adsorbing electrode, wherein the valuable metal includes gold, palladium, silver or indium.

39 Claims, 3 Drawing Sheets

(51) Int. Cl.
| | |
|---|---|
| C25B 11/00 | (2006.01) |
| C25B 11/12 | (2006.01) |
| C25B 9/06 | (2006.01) |
| C25C 7/02 | (2006.01) |
| C25C 1/20 | (2006.01) |
| C25C 1/22 | (2006.01) |
| C25C 7/08 | (2006.01) |
| C02F 1/469 | (2006.01) |
| C02F 3/00 | (2006.01) |
| C02F 3/34 | (2006.01) |
| C02F 1/461 | (2006.01) |

(52) U.S. Cl.
CPC .................. *C25C 1/22* (2013.01); *C25C 7/08* (2013.01); *C02F 3/34* (2013.01); *C02F 2001/46138* (2013.01)

(58) Field of Classification Search
USPC ........................................................ 205/566
See application file for complete search history.

(56) References Cited

U.S. PATENT DOCUMENTS

| | | | | |
|---|---|---|---|---|
| 6,267,871 | B1* | 7/2001 | Weakly | C02F 1/4678 204/275.1 |
| 6,665,169 | B2 | 12/2003 | Tennent et al. | |
| 8,097,185 | B2 | 1/2012 | Miller et al. | |
| 9,406,959 | B2 | 8/2016 | Worden et al. | |
| 9,416,390 | B2 | 8/2016 | Gaustad et al. | |
| 2004/0168909 | A1* | 9/2004 | Larson | C02F 1/46114 204/233 |
| 2011/0303554 | A1 | 12/2011 | Oguchi | |
| 2013/0059319 | A1 | 3/2013 | Erbeldinger et al. | |
| 2014/0193316 | A1* | 7/2014 | Han | C22B 7/006 423/1 |

FOREIGN PATENT DOCUMENTS

| | | |
|---|---|---|
| TW | I290224 | 10/1993 |
| TW | I487790 B | 6/2015 |
| WO | WO 2006/120396 A3 | 11/2006 |

OTHER PUBLICATIONS

A.V. Pethkar et al., "Comparative studies on metal biosorption by two strains of Cladosporium cladosporoides", Elsevier, Bioresource Technology 80, 211-215.

Ahmed M. Donia et al., "Recovery of gold (III) and silver (I) on a chemically modified chitosan with magnetic properties", Elsevier, Hydrometallurgy, 87, 2007, pp. 197-206.

Fouad Benchekroun et al., "Fluid inclusions and quantitative model for gold precipitation in the Tiouit deposit (Anti-Atlas, Morocco)". Elsevier, Journal of African Earth Sciences 39(2004), 295-300.

Inmaculada De Vargas et al., "Biosorption of palladium and platinum by sulfate-reducing bacteria", Journal of Chemical Technology and Biotechnology 2004, 79 (1), 49-56.

J.D. Miller, et al., "Characterization and electrochemical analysis of gold cementation from alkaline cyanide solution by suspended zinc particles". Hydrometallurgy 24(1990), 373-392.

Jianfeng Shen et al., "Covalent attaching protein to graphene oxide via diimide-activated amidation", Elsevier, Colloids and Surfaces B: Biointerfaces 81(2010), 434-438.

María E. Romero-Gonz'alez et al., "Spectroscopic studies of the biosorption of gold (III) by dealginated seaweed waste". Environmental Science and Technology 2003, 37 (18), pp. 4163-4169.

Michael B. Mooiman et al., "The chemistry of gold solvent extraction from alkaline cyanide solution by solvating extractants". Hydrometallurgy 27(1991), 29-46.

R.Y. Wan et al., "Research and development activities for the recovery of gold from alkaline cyanide solutions", Mineral Processing and Extractive Metallurgy Review 1990, vol. 6, 143-190.

R.Y. Wan et al., "Solvation extraction and electrodeposition of gold from cyanide solutions". Journal of Metals, Dec. 1986, pp. 35-40.

Rumi Chand et al., "Selective adsorption of precious metals from hydrochloric acid solutions using porous carbon prepared from barley straw and rice husk", Elsevier, Minerals Engineering 22(2009), 1277-1282.

Sung Wook Won et al., "Biosorbents for recovery of precious metals", Elsevier, Bioresource Technology 160(2014) pp. 203-212.

Tatsuo Maruyama et al., "Proteins and protein-rich biomass as environmentally friendly adsorbents selective for precious metal ions". Environmental Science and Technology 41(2007), pp. 1359-1364.

Y.N. Mata et al., "Gold (III) biosorption and bioreduction with the brown alga Fucus vesiculosus". Journal of Hazardous Materials, Elsevier, Journal of Hazardous Materials 166, 612-618.

Office Action dated Mar. 5, 2019 for Chinese Patent Application No. 201611248168.X.

Hu, "Influence of bacterial on the chalcopyrite surface property and its bioleaching mechanism", China Master's Theses Full-text Database, Dec. 3, 2014, pp. 81-82.

\* cited by examiner

US 10,323,331 B2

VALUABLE METAL SELECTIVELY ADSORBING ELECTRODE AND METHOD FOR SELECTIVELY RECOVERING VALUABLE METALS

TECHNICAL FIELD

The present disclosure relates to a valuable metal selectively adsorbing electrode and a method for selectively recovering valuable metals.

BACKGROUND

In the wastewater treatment and water-recycling processes, the separation and recovery of valuable substances is an important issue internationally. How to obtain useful resources including water and valuable substances from wastewater is a future trend.

Emission water from high-tech industries still contains valuable metals such as gold, indium, gallium, molybdenum, etc. However, these valuable metals are present in a medium or low concentration in large amounts of water and wastewater, and there are many kinds of metal ions in wastewater at low concentration. Therefore, taking the efficiency of selective separation and recovery and environmental friendliness into account, the chemical precipitation method or ion-exchange method at present are not applicable to the recovery of metals from wastewater.

Although the microbial protein has a significant effect on the adsorption of medium to low concentration of metal ions, and has the advantages of specificity, affinity and reversibility, the protein adsorbent is mostly present in a suspended state, and thus a subsequent solid-liquid separation procedure is needed.

Therefore, at present, a novel apparatus and technique for adsorbing valuable metals in a liquid, which can rapidly adsorb valuable metals in the liquid and easily separate the valuable metals from the adsorption apparatus are needed.

SUMMARY

The present disclosure provides a valuable metal selectively adsorbing electrode, comprising: an electrode formed by a carbon-containing material; and a protein of a bacterium of genus *Tepidimonas* immobilized on the electrode formed by a carbon-containing material to form the valuable metal selectively adsorbing electrode, wherein the valuable metal comprises gold, palladium, silver or indium.

The present disclosure also provides a method for selectively recovering a valuable metal, comprising: (a) bringing a liquid containing a valuable metal into contact with a valuable metal selectively adsorbing electrode, wherein the valuable metal selectively adsorbing electrode comprises: an electrode formed by a carbon-containing material; and a protein of a bacterium of genus *Tepidimonas* immobilized on the electrode formed by a carbon-containing material to form the valuable metal selectively adsorbing electrode, wherein the protein of a bacterium of genus *Tepidimonas* has an effect of selectively adsorbing a valuable metal; and (b) applying a voltage to the valuable metal selectively adsorbing electrode to allow the valuable metal in the liquid containing a valuable metal to adsorb to the valuable metal selectively adsorbing electrode, wherein the valuable metal comprises gold, palladium, silver or indium.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
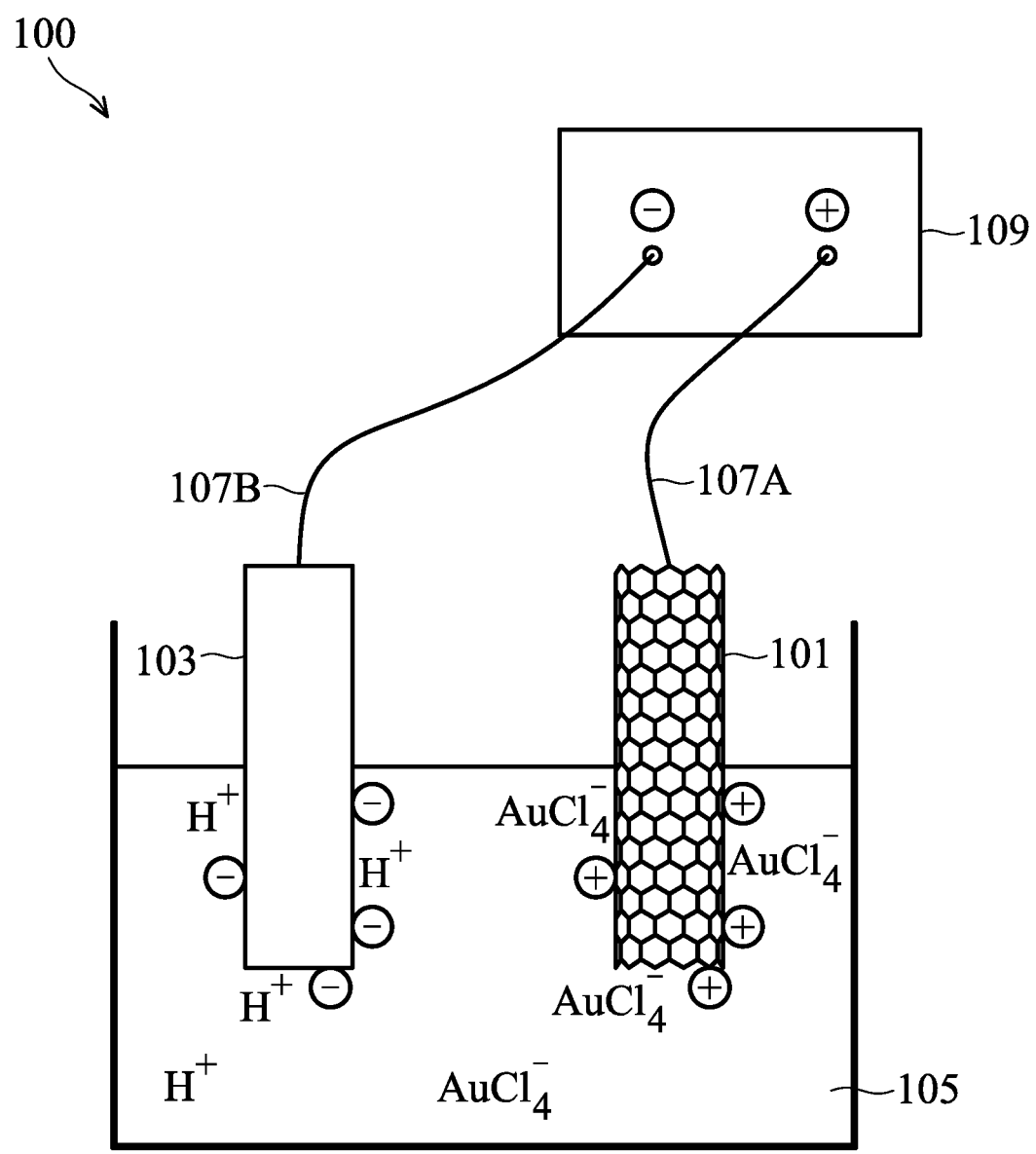
FIG. 1 shows a schematic diagram of a valuable metal electrochemical adsorption system 100 used in one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one aspect of the present disclosure, a valuable metal selectively adsorbing electrode is provided. The valuable metal selectively adsorbing electrode of the present disclosure has the ability to adsorb valuable metals, and it especially has the ability to selectively adsorb valuable metals. Moreover, the valuable metal mentioned above may include gold, palladium, silver, indium, etc., but it is not limited thereto.

The aforementioned valuable metal selectively adsorbing electrode of the present disclosure may include an electrode formed by a carbon-containing material, and include a protein of a bacterium of genus *Tepidimonas* immobilized on the electrode formed by a carbon-containing material to form the valuable metal selectively adsorbing electrode, wherein the protein of a bacterium of genus *Tepidimonas* has the effect of selectively adsorbing a valuable metal.

The electrode formed by the carbon-containing material mentioned above may be porous or have a high surface area to increase the immobilized amount of the protein of a bacterium of genus *Tepidimonas*, but it is not limited thereto.

Furthermore, examples of the aforementioned carbon-containing material may include, but are not limited to, carbon fiber cloth (carbon cloth), activated carbon fiber cloth, activated carbon, carbon nanotube (CNT) and graphene. In one embodiment, the aforementioned carbon-containing material itself can be used directly as an electrode. In addition, in one embodiment, the carbon-containing material mentioned above may be carbon fiber cloth.

In addition, in one embodiment, the aforementioned electrode formed by a carbon-containing material may include a collector plate for immobilizing the carbon-containing material. There are no particular limitations on the material that may be used in the collector plate, only that is must be a conductive material, such as titanium and graphite, but it is not limited thereto. Moreover, in this embodiment, a carbon-containing material which is immobilized on the collector plate may include activated carbon, carbon nanotube (CNT), graphene, etc., but it is not limited thereto.

Furthermore, in one embodiment, the aforementioned carbon-containing material used for forming the electrode may be subjected to an acid oxidization treatment, to promote the immobilization of the protein of a bacterium of genus *Tepidimonas*. Moreover, the agent for the acid oxidization treatment may include nitric acid, sulfuric acid, or a combination thereof, but it is not limited thereto.

In another embodiment, after the acid oxidization treatment mentioned above, the carbon-containing material may be further subjected to an amidation treatment. Moreover, the agent for the amidation treatment may include, but is not limited to 1-Ethyl-3-(3-dimethylaminopropyl) carbodiimide hydrochloride (EDAC) and/or N-hydroxysuccinimide (NHS), etc. Furthermore, in a specific embodiment, the agent for the amidation treatment, in addition to the aforementioned 1-Ethyl-3-(3-dimethylaminopropyl) carbodiimide hydrochloride (EDAC) and/or N-hydroxysuccinimide (NHS), etc., may further include 2-Morpholino-ethanesulfonic acid (MES) or monopotassium phosphate ($KH_2PO_4$).

In the valuable metal selectively adsorbing electrode of the present disclosure, the foregoing bacterium of genus *Tepidimonas* may include, for example, *Tepidimonas fonticaldi*, but it is not limited thereto.

Furthermore, a protein of the aforementioned bacterium of genus *Tepidimonas* used for the valuable metal selectively adsorbing electrode of the present disclosure may be an intracellular protein, an extracellular protein, a combination thereof, etc., and it has no particular limitation. In one embodiment, a protein of the aforementioned bacterium of genus *Tepidimonas* is an extracellular protein.

In one embodiment, the bacterium of genus *Tepidimonas* mentioned above may be *Tepidimonas fonticaldi* sp. nov. of which a public deposit was made at the Bioresource Collection and Research Center (BCRC), ROC on Nov. 21, 2011, the deposit number of which is BCRC 80391, and a public deposit of this strain was also made at the Laboratorium voor Microbiologie Gent' Belgium (LMG) on Nov. 28, 2011, the deposit number thereof is LMG26746. The bacterium can be freely furnished. Similarly, a protein of the aforementioned *Tepidimonas fonticaldi* sp. nov. BCRC 80391 used for the valuable metal selectively adsorbing electrode of the present disclosure may be an intracellular protein, an extracellular protein, or a combination thereof, and it has no particular limitation. In a specific embodiment, a protein of the aforementioned *Tepidimonas fonticaldi* sp. nov. BCRC 80391 may be an extracellular protein.

Moreover, in the embodiment in which a bacterium of genus *Tepidimonas* may be *Tepidimonas fonticaldi* sp. nov. BCRC 80391, in the valuable metal selectively adsorbing electrode of the present disclosure, the carbon-containing material for forming the electrode may be carbon fiber cloth.

Furthermore, in this embodiment, the carbon fiber cloth is subjected to an acid oxidization treatment and an amidation treatment after the acid oxidization treatment to promote the immobilization of the protein of *Tepidimonas fonticaldi* sp. nov. BCRC 80391. Moreover, the agent for the acid oxidization treatment may include nitric acid, sulfuric acid, a combination thereof, etc., but it is not limited thereto. In addition, the agent for the amidation treatment may include, but is not limited to 1-Ethyl-3-(3-dimethylaminopropyl) carbodiimide hydrochloride (EDAC) and/or N-hydroxysuccinimide (NHS), etc. Furthermore, in a specific embodiment, the agent for the amidation treatment, in addition to the aforementioned 1-Ethyl-3-(3-dimethylaminopropyl) carbodiimide hydrochloride (EDAC) and/or N-hydroxysuccinimide (NHS), etc., may further include 2-morpholino-ethanesulfonic acid (MES).

Furthermore, in this embodiment, the valuable metal may be gold.

In addition, any valuable metal selectively adsorbing electrode of the present disclosure mentioned above may be applicable to an electrochemical adsorption system, but it is not limited thereto. The electrochemical adsorption system may be as an electrochemical adsorption system 100 shown in FIG. 1. It is noted that FIG. 1 is merely a schematic diagram while an electrochemical adsorption system to which the valuable metal selectively adsorbing electrode of the present disclosure is applicable may be appropriately adjusted according to the actual operation condition and the metal which is needed to be adsorbed.

Refer to FIG. 1. In an electrochemical adsorption system 100, a valuable metal adsorbing electrode of the present disclosure 101 and a counter electrode 103 are immersed in a liquid containing a valuable metal, and the valuable metal adsorbing electrode 101 and the counter electrode 103 are connected to a power supply with conductive lines 107A and 107B, respectively. A voltage may be applied by a power supply, and positive electricity or negative electricity may be applied to the valuable metal adsorbing electrode 101 and the counter electrode 103 to allow the valuable metal in the liquid containing a valuable metal to adsorb to the valuable metal adsorbing electrode 101 which is oppositely charged to the valuable metal.

Furthermore, in another aspect of the present disclosure, a method for selectively recovering a valuable metal is provided. The method for selectively recovering a valuable metal of the present disclosure may be performed by any of the aforementioned valuable metal selectively adsorbing electrodes of the present disclosure. Moreover, the method for selectively recovering a valuable metal of the present disclosure can effectively recover a valuable metal, especially can selectively recover a valuable metal, and has advantages of high-speed and low cost, easy operation and no need to add an additional agent.

The method for selectively recovering a valuable metal of the present disclosure may include the following steps, but it is not limited thereto.

First, a liquid containing a valuable metal is contacted with any of the aforementioned valuable metal selectively adsorbing electrodes of the present disclosure.

Then, a voltage is applied to the valuable metal selectively adsorbing electrode to allow the valuable metal in the liquid containing a valuable metal to adsorb to the aforementioned valuable metal selectively adsorbing electrode to recover the valuable metal. The valuable metal may include gold, palladium, silver, indium, etc., but it is not limited thereto. In one embodiment, the valuable metal is gold.

Furthermore, the voltage applied to the valuable metal selectively adsorbing electrode mentioned above may be about 0.5-2.0 V, but it is not limited thereto. In one embodiment, the voltage applied to the valuable metal selectively adsorbing electrode mentioned above may be about 1 V.

In addition, the voltage may be applied to the valuable metal selectively adsorbing electrode mentioned above for about 5-30 minutes. In one embodiment, the voltage may be applied to the valuable metal selectively adsorbing electrode mentioned above for about 15 minutes.

Moreover, the concentration of valuable metal in the aforementioned liquid containing a valuable metal may be about 1-100 mg/L, but it is not limited thereto.

In one embodiment, the method for selectively recovering a valuable metal of the present disclosure, after a valuable metal of the liquid containing a valuable metal adsorbs to the aforementioned valuable metal selectively adsorbing electrode, may further include a step of desorbing the valuable metal which is adsorbed on the valuable metal selectively adsorbing electrode from the valuable metal selectively adsorbing electrode.

The aforementioned step of desorbing has no particular limitation, only that it can allow the valuable metal desorb from the valuable metal selectively adsorbing electrode mentioned above, and have no adverse effect on the valuable metal and/or the electrode. In one embodiment, a voltage which is oppositely charged to that is applied during the adsorbing is applied to the aforementioned valuable metal selectively adsorbing electrode, and then the valuable metal can desorb from the valuable metal selectively adsorbing electrode.

In addition, an implementing condition for the method for selectively recovering a valuable metal of the present disclosure may be shown as FIG. 1, but it is not limited thereto. It is noted that FIG. 1 is merely a schematic diagram while the method for selectively recovering a valuable metal of the present disclosure may be appropriately adjusted according to the actual operation condition and the metal which is needed to be adsorbed.

Refer to FIG. 1. A valuable metal adsorbing electrode of the present disclosure 101 and a counter electrode 103 are immersed in a liquid containing a valuable metal, and the valuable metal adsorbing electrode 101 and the counter electrode 103 are connected to a power supply with conductive lines 107A and 107B, respectively. Next, a power supply applies a voltage, and applies positive electricity or negative electricity to the valuable metal adsorbing electrode 101 and the counter electrode 103 to allow the valuable metal in the liquid containing a valuable metal to adsorb to the valuable metal adsorbing electrode 101 which is oppositely charged to the valuable metal.

In addition, after the adsorption is completed, the valuable metal adsorbing electrode 101 and the counter electrode 103 may be taken out from the liquid containing a valuable metal. After that, the valuable metal adsorbing electrode 101 and the counter electrode 103 are immersed in a liquid without metal, and then a power supply applies a reverse voltage, i.e. respectively applies electricity which are oppositely charged to those is applied during the adsorbing to the valuable metal adsorbing electrode 101 and the counter electrode 103 to allow the valuable metal to desorb from the valuable metal selectively adsorbing electrode 101.

EXAMPLES

A. Material and Method

1. Activation and Enrichment Culture of Strain

*Tepidimonas fonticaldi* sp. nov. BCRC 80391 (of which a public deposit was made at the Bioresource Collection and Research Center (BCRC), ROC on Nov. 21, 2011, the deposit number of which is BCRC 80391. A public deposit of this strain was also made at the Laboratorium voor Microbiologie Gent' Belgium (LMG) on Nov. 28, 2011, the deposit number of which is LMG26746. The bacterium can be freely furnished.) strain was taken out from a strain freezer. 500 µL, of frozen bacterial suspension was implanted in 50 mL of ⅕ TSB (Tryptocase Soy Broth) liquid medium, and activated by at 55° C., shaking at a rate of 180 rpm for 24 hours. After the bacterial activation was completed, 1 mL of the activated bacterial suspension was implanted in 100 mL of liquid medium, and an enrichment culture was performed thereon in a condition of shaking rate at 180 rpm and 55° C. for 2 days to obtain a fermentation liquid.

After that, the fermentation liquid was centrifuged to remove the bacteria and obtain a supernatant. The supernatant contained extracellular proteins secreted by the bacterial strain, and the supernatant was used as a protein suspension in the subsequent protein immobilization experiment.

The results of adsorption kinetics experimentation show that extracellular proteins secreted by the bacterial strain could achieve adsorption equilibrium in a very short time, wherein the time it took to achieve adsorption equilibrium was about 2 minutes and the reaction rate was 0.085 minutes$^{-1}$.

Furthermore, the results of the adsorption isotherm experiment show that the maximum absorption capacity for gold of the extracellular proteins secreted by the bacterial strain was 3.2 mg/mg, and the absorption ability is obviously better than a commercial pure protein mentioned in the literature (Maruyama, T., Matsushita, H., Shimada, Y., Kamata, I., Hanaki, M., Sonokawa, S., Kamiya, N., Goto, M., 2007. Proteins and protein-rich biomass as environmentally friendly adsorbents selective for precious metal ions. Environmental Science and Technology 41, 1359-1364.) (the maximum absorption capacity for gold of ovalbumin was 0.04 mg Au/mg; the maximum absorption capacity for gold of bovine serum albumin (BSA) was 0.04 mg Au/mg).

2. Determination of Bacterial Concentration

The absorbance at 600 nm visible light for the aforementioned fermentation liquid was determined by a spectra photometer to determine the bacterial concentration and to determine the growth condition of the bacteria in the culturing system.

3. Determination of Protein Concentration

Determination of protein concentration was performed by a Bradford protein assay.

Description of Bradford protein assay is provided below.

This assay utilizes the properties of Coomassie Brilliant Blue G-250 dye to convert to the color red from the color blue after it combines with the specific amino acids of a protein, and it has higher absorbance at 595 nm to detect a protein. Moreover, bovine serum albumin (BSA) is used as a standard for a protein concentration assay, and according to a standard curve established by the standard with known concentrations, the protein concentration of a solution to be tested can be deduced.

4. Preparation of Valuable Metal Adsorbing Electrode (Carbon Material Modification and Protein Immobilization)

In this experiment, a conductive heating carbon fiber cloth (CW) (Taiwan Carbon Technology Co., Ltd) and a KoTHmex activated carbon fiber cloth (AW) (Taiwan Carbon Technology Co., Ltd) were used as carbon material electrodes for immobilization of protein. Moreover, the basic properties of conductive heating carbon fiber cloth (CW) and KoTHmex activated carbon fiber cloth (AW) are summarized in the following Table 1.

TABLE 1

| Basic properties of carbon fiber cloth | | |
|---|---|---|
| Carbon fiber cloth | CW[a] | AW[b] |
| Specific Surface Area (m$^2$/g) | 208.3 | 971.3 |
| Pore Volume (cm$^3$/g) | 0.103 | 0.519 |
| BJH pore size (nm) | 5.94 | 2.53 |

[a]Taiwan Carbon Technology Co., Ltd; Part number: CW1003; Basis weight: 190 ± 20 g/m$^2$; Thickness: 0.5 ± 0.1 mm
[b]Taiwan Carbon Technology Co., Ltd; Part number: AW1501; Basis weight: 750 ± 15 g/m$^2$; Thickness: 0.40 ± 0.1 mm Moreover, the preparation method for each Preparation example of protein immobilization for carbon material is described below.

(1) Preparation Example 1

A conductive heating carbon fiber cloth (CW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth. After that, the carbon fiber cloth was washed with deionized water.

After washing, the carbon fiber cloth was immersed in 30 mL of protein suspension and shaken at room temperature at 150 rpm for 24 hours, and then washed with deionized water (10 mL) twice to obtain a carbon material electrode with protein immobilization.

(2) Preparation Example 2

A conductive heating carbon fiber cloth (CW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth to raise the effect of amidation on the surface of the carbon fiber cloth. After that, the carbon fiber cloth was washed with deionized water.

After washing, an amidation was performed on the carbon fiber cloth, and the steps for the amidation are described below.

The carbon fiber cloth was immersed in a mixed solution of an N-hydroxysuccinimide (NHS) solution (as an amidation coupling agent) (10 mL; 50 mg/mL; pH 2.99) and a 2-morpholino-ethanesulfonic acid (MES) buffer solution (10 mL; 0.001 M; pH 4.55), and shaken at room temperature at 150 rpm for 15 minutes.

Next, the carbon fiber cloth was immersed in a 1-Ethyl-3-(3-dimethylaminopropyl) carbodiimide hydrochloride (EDAC) solution (as an amidation coupling agent) (12 mL; 10 mg/mL), and shaken at room temperature at 150 rpm for 30 minutes. After that, the carbon fiber cloth was washed with 2-morpholino-ethanesulfonic acid (MES) buffer solution (10 mL; 0.001 M; pH 4.55) twice.

Finally, the carbon fiber cloth was immersed in 30 mL of protein suspension and shaken at room temperature at 150 rpm for 24 hours, and then washed with deionized water (10 mL) twice to obtain a carbon material electrode with protein immobilization.

(3) Preparation Example 3

A conductive heating carbon fiber cloth (CW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth to raise the effect of amidation on the surface of the carbon fiber cloth. After that, the carbon fiber cloth was washed with deionized water.

After washing, an amidation was performed on the carbon fiber cloth, and the steps of the amidation are described below.

The carbon fiber cloth was immersed in an N-hydroxysuccinimide (NHS) solution (as an amidation coupling agent) (10 mL; 50 mg/mL; pH 2.99), and shaken at room temperature at 150 rpm for 15 minutes.

Next, the carbon fiber cloth was immersed in a 1-Ethyl-3-(3-dimethylaminopropyl) carbodiimide hydrochloride (EDAC) solution (as an amidation coupling agent) (12 mL; 10 mg/mL), and shaken at room temperature at 150 rpm for 30 minutes. After that, the carbon fiber cloth was washed with deionized water twice.

Finally, the carbon fiber cloth was immersed in 30 mL of protein suspension and shaken at room temperature at 150 rpm for 24 hours, and then washed with deionized water (10 mL) twice to obtain a carbon material electrode with protein immobilization.

(4) Preparation Example 4

A KoTHmex activated carbon fiber cloth (AW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth. After that, the carbon fiber cloth was washed with deionized water.

After washing, the carbon fiber cloth was immersed in 30 mL of protein suspension and shaken at room temperature at 150 rpm for 24 hours, and then washed with deionized water (10 mL) twice to obtain a carbon material electrode with protein immobilization.

(5) Preparation Example 5

A KoTHmex activated carbon fiber cloth (AW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth to raise the effect of amidation on the surface of the carbon fiber cloth. After that, the carbon fiber cloth was washed with deionized water.

After washing, an amidation was performed on the carbon fiber cloth, and the steps of the amidation are described below.

The carbon fiber cloth was immersed in a mixed solution of an N-hydroxysuccinimide (NHS) solution (as an amidation coupling agent) (10 mL; 50 mg/mL; pH 2.99) and a 2-morpholino-ethanesulfonic acid (MES) buffer solution (10 mL; 0.001 M; pH 4.55), and shaken at room temperature at 150 rpm for 15 minutes.

Next, the carbon fiber cloth was immersed in a 1-Ethyl-3-(3-dimethylaminopropyl) carbodiimide hydrochloride (EDAC) solution (as an amidation coupling agent) (12 mL; 10 mg/mL), and shaken at room temperature at 150 rpm for 30 minutes. After that, the carbon fiber cloth was washed with 2-morpholino-ethanesulfonic acid (MES) buffer solution (10 mL; 0.001 M; pH 4.55) twice.

Finally, the carbon fiber cloth was immersed in 30 mL of protein suspension and shaken at room temperature at 150 rpm for 24 hours, and then washed with deionized water (10 mL) twice to obtain a carbon material electrode with protein immobilization.

(6) Preparation Example 6

A KoTHmex activated carbon fiber cloth (AW) was cut to a size of 2*2 cm$^2$.

After that, an acid oxidization was performed on the carbon fiber cloth, and the steps of the acid oxidization are described below.

First, the carbon fiber cloth was washed with acetone. Next, the carbon fiber cloth was placed in a 3 M nitric acid solution, and subjected to a 70° C. heat treatment for 24 hours, wherein the purpose of this step was to increase carboxyl groups (—COOH) on the surface of the carbon fiber cloth to raise the effect of amidation on the surface of the carbon fiber cloth. After that, the carbon fiber cloth was washed with deionized water.

After washing, an amidation was performed on the carbon fiber cloth, and the steps of the amidation are described below.

The carbon fiber cloth was immersed in an N-hydroxysuccinimide (NHS) solution (as an amidation coupling agent) (10 mL; 50 mg/mL; pH 2.99), and shaken at room temperature at 150 rpm for 15 minutes.

Next, the carbon fiber cloth was immersed in a 1-Ethyl-3-(3-dimethylaminopropyl) carbodiimide hydrochloride (EDAC) solution (as an amidation coupling agent) (12 mL; 10 mg/mL), and shaken at room temperature at 150 rpm for 30 minutes. After that, the carbon fiber cloth was washed with deionized water twice.

Finally, the carbon fiber cloth was immersed in 30 mL of protein suspension and shaken at room temperature at 150 rpm for 24 hours, and then washed with deionized water (10 mL) twice to obtain a carbon material electrode with protein immobilization.

Treatments which are performed on the carbon fiber cloth in the Preparation examples 1-6 are summarized in the following Table 2.

TABLE 2

| Preparation example | Carbon fiber cloth | Procedure for protein immobilization [a] |
|---|---|---|
| 1 | CW | Acid oxidization→ Immersing in a protein suspension |
| 2 | | Acid oxidization→ Amidation→ Immersing in a protein suspension (with MES buffer treatment) |
| 3 | | Acid oxidization→ Amidation→ Immersing in a protein suspension (without MES buffer treatment) |
| 4 | AW | Acid oxidization→ Immersing in a protein suspension |
| 5 | | Acid oxidization→ Amidation→ Immersing in a protein suspension (with MES buffer treatment) |
| 6 | | Acid oxidization→ Amidation→ Immersing in a protein suspension (without MES buffer treatment) |

[a] pH value of the protein suspension was 7.5

5. Quantification of Protein Immobilized on the Electrode

Calculation manner for the amount of immobilized protein is described below.

The protein concentration variation for the protein suspension before and after an electrode (carbon fiber cloth) is immersed was calculated, and the variation is multiplied by the volume of the protein suspension to obtain the weight of protein immobilized on the carbon fiber cloth, and then the aforementioned weight of protein immobilized on the carbon fiber cloth is divided by area of the electrode to obtain the weight of protein immobilized per square meters. The detailed formula for the calculation is as follows:

Amount of immobilized protein (mg/m$^2$)={[Initial concentration of protein suspension (mg/L)−Concentration of protein suspension after electrode is immersed (mg/L)]×Volume of protein suspension (L)}/Area of electrode (m$^2$)

6. Gold Adsorption Experiment for Valuable Metal Adsorbing Electrode

Gold adsorption experiment in water was performed on the aforementioned valuable metal adsorbing electrode which has been completely prepared.

FIG. 1 shows a schematic diagram of a valuable metal electrochemical adsorption system 100 used in this experiment.

First, an Au stock solution (15 mg/L HAuCl$_4$.3H$_2$O) 105 was prepared. Next, a valuable metal adsorbing electrode 101 and a counter electrode 103 were immersed in the Au stock solution, and the valuable metal adsorbing electrode 101 and the counter electrode 103 were connected to a power supply with conductive lines 107A and 107B, respectively. After that, the power supply applied a voltage of 1V and respectively applied positive electricity and negative electricity to the valuable metal adsorbing electrode 101 and the counter electrode 103 for 15 minutes to allow AuCl$^{4-}$ ions in the Au stock solution adsorb to the valuable metal adsorbing electrode 101 which was applied with positive electricity.

After that, the Au stock solution was filtered with a 0.45 μm filter to remove the impurity in the solution, and then Au concentration of the solution was analyzed by an inductively coupled plasma atomic emission spectrometer (ICP-AES), and Au adsorption amount for the valuable metal adsorbing electrode, Au adsorption rate for the valuable metal adsorbing electrode and Au adsorption rate for the protein of the valuable metal adsorbing electrode were calculated.

Calculation manner for the Au adsorption amount is described below.

The Au concentration variation for the Au solution before and after the electrochemical adsorption was calculated, and the variation is multiplied by the volume of the Au solution to obtain the weight of Au adsorbed by the valuable metal adsorbing electrode, and then the aforementioned weight of Au adsorbed by the valuable metal adsorbing electrode is divided by the weight of the electrode to obtain the Au adsorption amount per unit weight. The detailed formula for the calculation is as follows:

Au adsorption amount (mg/g)={[Initial concentration of Au solution (mg/L)−Concentration of Au solution after electrochemical adsorption (mg/L)]×Volume of Au solution (L)}/Weight of electrode (m$^2$)

Furthermore, the manner employed to calculate the Au adsorption rate for the valuable metal adsorbing electrode was that the aforementioned Au adsorption amount was divided by the time it took for electrochemical adsorption, while the Au adsorption rate for the protein of the valuable metal adsorbing electrode was calculated by dividing the net weight of the protein immobilized on the electrode by the time it took for electrochemical adsorption.

7. Gold Selective Adsorption Experiment for Valuable Metal Adsorbing Electrode

The valuable metal electrochemical adsorption system used in this experiment was substantially the same as the valuable metal electrochemical adsorption system 100 shown in FIG. 1, and only the test solutions were different.

First, a mixed solution of Au and Co (initial concentrations of Au and Co were both 40 mg/L) 105 was prepared. Next, a valuable metal adsorbing electrode 101 and a counter electrode 103 were immersed in the mixed solution, and the valuable metal adsorbing electrode 101 and the counter electrode 103 were connected to a power supply with conductive lines 107A and 107B, respectively. After that, the power supply applied a voltage of 1V and respectively applied positive electricity and negative electricity to the valuable metal adsorbing electrode 101 and the counter electrode 103 for 15 minutes.

After that, the mixed solution was filtered with a 0.45 μm filter to remove impurity in the solution, and then the concentrations of Au and CO of the mixed solution were analyzed by an inductively coupled plasma atomic emission spectrometer (ICP-AES), and Au adsorption amount and Co adsorption amount for the valuable metal adsorbing electrode, Au distribution coefficient ($Kd_{Au}$) and Co distribution coefficient ($Kd_{Co}$) and Au selectivity coefficient were calculated.

The calculation manner for the Au adsorption amount is described above, and the calculation manner for the Co adsorption amount is substantially the same as that for the Au adsorption amount, and only the Au concentration has to be replaced with the Co concentration.

In addition, the Au distribution coefficient ($Kd_{Au}$) is obtained by dividing the Au adsorption amount by the Au initial concentration. Similarly, the Co distribution coefficient ($Kd_{Co}$) is obtained by dividing the Co adsorption amount by the Co initial concentration.

Furthermore, the Au selectivity coefficient is obtained by dividing the Au distribution coefficient ($Kd_{Au}$) by the Co distribution coefficient ($Kd_{Co}$).

B. Results

1. Quantification of Protein Immobilized on the Electrode

Proteins contained in the valuable metal adsorbing electrodes which were prepared in the aforementioned Preparation example 1 to Preparation example 6 were quantified to determine the mass of proteins which were immobilized on the electrodes in each Preparation example. The calculation manner for the mass of the protein immobilized on the electrode is shown above. The protein quantification results for the valuable metal adsorbing electrode prepared in each Preparation example are shown in Table 3.

TABLE 3

Quantification of proteins contained by the valuable metal adsorbing electrodes which were prepared in the aforementioned Preparation example 1 to Preparation example 6

| Preparation example | Carbon fiber cloth | Addition of amidation coupling agent | Addition of buffer solution | Amount of immobilized protein (mg/m$^2$) |
|---|---|---|---|---|
| 1 | CW | No | No | 22.6 |
| 2 | | Yes | Yes | 29.2 |
| 3 | | Yes | No | 131.5 |
| 4 | AW | No | No | 0.0 |
| 5 | | Yes | Yes | 12.4 |
| 6 | | Yes | No | 55.3 |

According to Table 3, it is known that if an electrode (carbon fiber cloth) is not subjected to an amidation modification and is directly immersed in the protein suspension, the protein immobilization effect will not be good. Conversely, compared to an electrode (carbon fiber cloth) which has not been subjected to an amidation modification, an electrode (carbon fiber cloth) which was subjected to an amidation modification has a higher amount of immobilized protein per unit area, especially since the amount of immobilized protein for the valuable metal adsorbing electrode (CW carbon fiber cloth) prepared in Preparation example 3 achieved up to 131.5 mg/m$^2$.

Since the pH value of the protein suspension used in the protein immobilization procedure had been 7.5, there was no need to add a buffer and a protein/carbon material electrode with a high amount of immobilized protein could be obtained, and that could simplify the protein immobilization procedure.

In addition, with regard to the amount of immobilized protein, using the CW carbon fiber cloth as an immobilizing substrate resulted in a higher amount of immobilized protein than using the AW carbon fiber cloth as a immobilizing substrate, and thus the surface property differences between the two kinds of carbon fiber cloth substrate before and after an acid oxidization modification were analyzed using an X-ray photoelectron spectroscopy (XPS) (Brand: Thermo VG; Item No: ESCAlab 250) (X-ray source: Al Kα; Scan range: 293.6-280.6 eV; Binding energy gap: 0.1 eV).

Figure 2A:
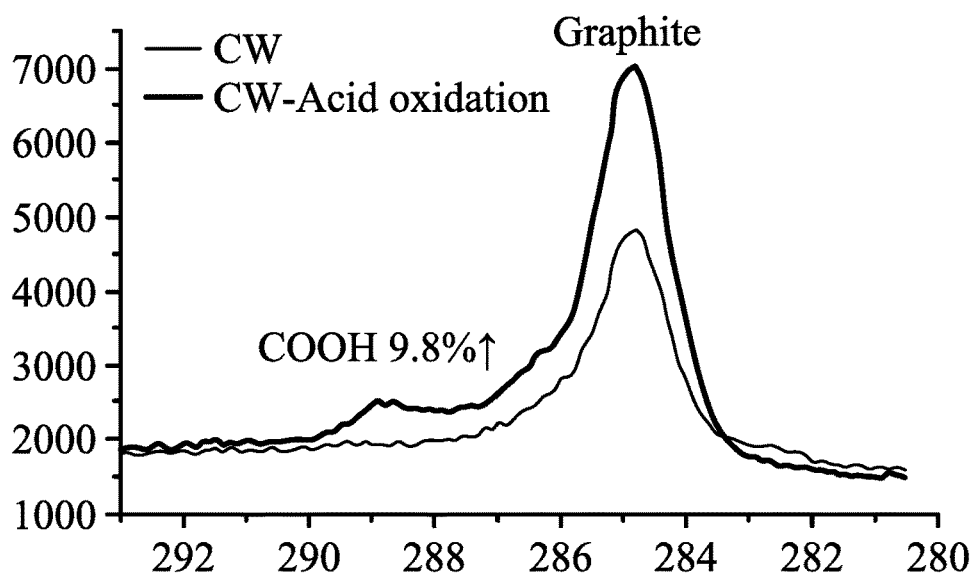
FIG. 2A shows the surface properties of a conductive heating carbon fiber cloth (CW) before and after an acid oxidization modification.
Figure 2B:
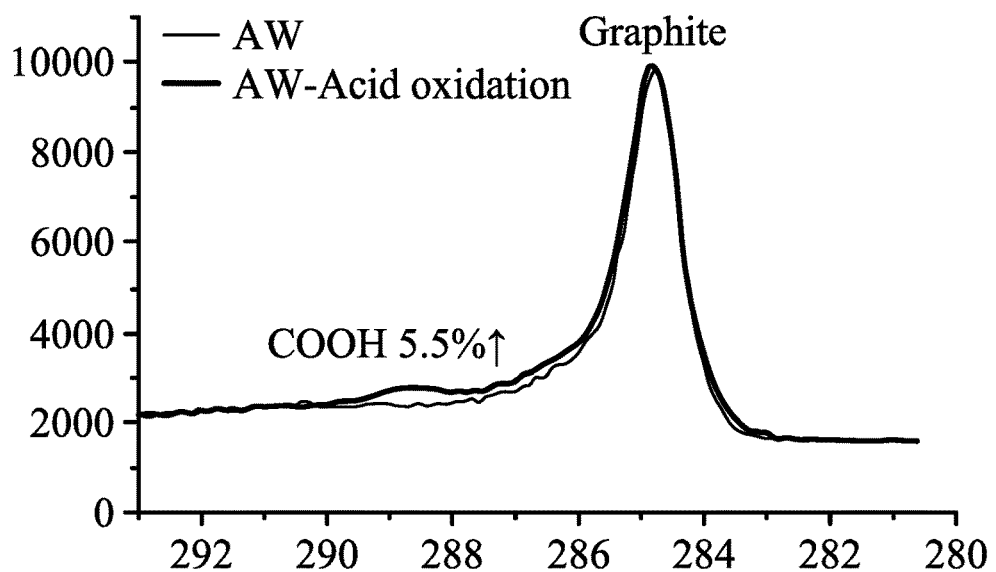
FIG. 2B shows the surface properties of a KoTHmex activated carbon fiber cloth (AW) before and after an acid oxidization modification.

The results are shown in FIG. 2A and FIG. 2B. FIG. 2A shows the surface properties of the CW carbon fiber cloth before and after an acid oxidization modification. FIG. 2B shows the surface properties of the AW carbon fiber cloth before and after an acid oxidization modification.

According to FIG. 2A and FIG. 2B, it was known that after acid oxidization, the content of carboxyl groups (—COOH) for the CW carbon fiber cloth was 9.8% which was higher than 5.5% for the AW carbon fiber cloth. When this result was compared with the result of the amount of immobilized protein, it was confirmed that the content of carboxyl groups would influence the modification effect of amidation, and would subsequently directly influence the amount of immobilized protein.

2. Gold Adsorption Experiment for Valuable Metal Adsorbing Electrode

Gold adsorption experiment was performed on the valuable metal adsorbing electrodes prepared in the aforementioned Preparation example 2 and Preparation example 3 to determine Au adsorption amounts and Au adsorption rates for the electrodes, and Au adsorption rates for the protein of the electrodes, wherein CW carbon fiber cloth was used as an adsorbing electrode in the control group. The experimental method is described above. The experimental results are shown in Table 4.

TABLE 4

The results of gold adsorption experiment

| Electrode | Amount of immobilized protein (mg/m²) | Au adsorption amount (mg/g) | Au adsorption rate | |
|---|---|---|---|---|
| | | | Electrode (µg/g-minute) | Protein (mg/g-minute) |
| CW | 0 | 0.495 | 33.0 | — |
| Preparation example 2 (CW with protein immobilization) | 29.2 | 0.801 | 46.7 | 55.1 |
| Preparation example 3 (CW with protein immobilization) | 131.5 | 0.656 | 43.8 | 9.6 |

According to Table 4, it was known that the Au adsorption amounts of the carbon fiber cloths immobilized with protein (Preparation example 2 and Preparation example 3) were both higher than that of the carbon fiber cloth (CW) without protein. The Au adsorption rates of the carbon fiber cloth electrodes after being immobilized with protein (Preparation example 2 and Preparation example 3) were also higher than that of the CW electrode.

Furthermore, in the valuable metal adsorbing electrodes prepared in Preparation example 2 and Preparation example 3, the proteins could provide an adsorption rate of 9.6-55.1 mg/g-minute. That showed the importance of the protein and showed that by using a carbon material electrode immobilized with a protein with Au adsorption properties to adsorb a gold-containing solution, the present disclosure could raise the adsorption amount for the electrode and reduce the time required for Au adsorption. Therefore, the carbon material electrode immobilized with a protein with Au adsorption properties of the present disclosure is superior.

3. Gold Selective Adsorption Experiment for Valuable Metal Adsorbing Electrode

Gold selective adsorption experiment was performed on the valuable metal adsorbing electrode prepared in the aforementioned Preparation example 3 to determine Au adsorption amount and Co adsorption amount for the electrode, Au distribution coefficient ($Kd_{Au}$) and Co distribution coefficient ($Kd_{Co}$) and Au selectivity coefficient for the electrode, wherein CW carbon fiber cloth was used as an adsorbing electrode in the control group, and Au adsorption rate of suspended protein was determined at the same time. The experimental method is described above. The experimental results are shown in Table 5 and FIG. 3.

Figure 3:
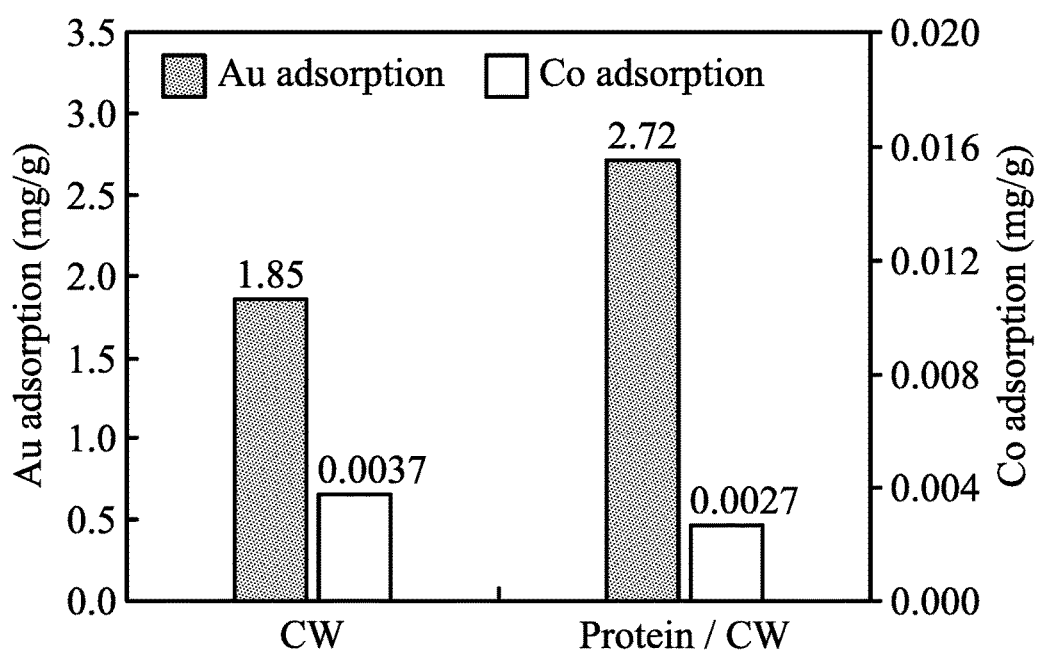
FIG. 3 shows adsorption to gold and cobalt of a valuable metal adsorbing electrode of one embodiment of the present disclosure and conductive heating carbon fiber cloth (CW) electrode.

According to Table 5 and FIG. 3, it was known that, the Au adsorption amount and adsorption rate of the carbon fiber cloth electrode immobilized with protein (Preparation example 3) was better than that of the CW electrode, and the Au selectivity in water of the carbon fiber cloth electrode immobilized with protein (Preparation example 3) up to 889 which is twice that of the CW electrode. This result shows that, in the present disclosure, when using a carbon material electrode immobilized with a protein with Au adsorption properties to adsorb a gold-containing solution, in addition to there being a considerable adsorption amount, it also has adsorption selectivity and will not influence the original function of the protein.

In addition, the Au adsorption rate of the protein of the valuable metal adsorbing electrode of the present disclosure (50.5 mg/g/minute) was nearly 20 times the adsorption rate of the pure protein suspension (2.63 mg/g/minute), and the results clearly show that by using the valuable metal adsorbing electrode of the present disclosure to perform electrochemical adsorption, adsorption efficiency of the protein could be greatly enhanced and thereby the adsorption time could be effectively reduced.

Accordingly, based on the above results, it can be known that the valuable metal adsorbing electrode and the method of using it to adsorb valuable metal of the present disclosure have the advantages of effectively increasing the adsorption amount of the electrode, increasing the adsorption efficiency of the protein, and reducing the gold adsorption time, and they can effectively selectively adsorb the desired metal and thus has high use-value.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A valuable metal selectively adsorbing electrode, comprising:
    an electrode formed by a carbon-containing material; and
    a protein of a bacterium of genus *Tepidimonas* immobilized on the electrode formed by a carbon-containing material to form the valuable metal selectively adsorbing electrode,
    wherein the valuable metal comprises gold, palladium, silver or indium.

2. The valuable metal selectively adsorbing electrode as claimed in claim 1, wherein the carbon-containing material

TABLE 5

The results of gold selective adsorption experiment

| Suspended protein/Electrode | Amount of immobilized protein (mg/m²) | Au adsorption amount (mg/g) | Au adsorption rate | | Au selectivity * |
|---|---|---|---|---|---|
| | | | Electrode (µg/g/minute) | Protein (mg/g/minute) | |
| Suspended protein * | — | — | — | 2.63 | — |
| CW | 0 | 1.85 | 123.4 | — | 444 |
| Preparation example 3 (CW with protein immobilization) | 131.5 | 2.72 | 181.0 | 50.5 | 889 |

* In the adsorption experiment, wastewater from a printed circuit board factory was used (containing Au, Co, K, Ni and Na; Au initial concentration: 13.1 mg/L)

comprises carbon cloth, activated carbon cloth, activated carbon, carbon nanotube (CNT) or graphene.

3. The valuable metal selectively adsorbing electrode as claimed in claim 1, wherein the electrode formed by a carbon-containing material comprises a collector plate for immobilizing the carbon-containing material thereon.

4. The valuable metal selectively adsorbing electrode as claimed in claim 3, wherein the carbon-containing material comprises activated carbon, carbon nanotube (CNT) or graphene.

5. The valuable metal selectively adsorbing electrode as claimed in claim 1, wherein the carbon-containing material is subjected to an acid oxidization treatment to promote the immobilization of the protein of a bacterium of genus *Tepidimonas*.

6. The valuable metal selectively adsorbing electrode as claimed in claim 5, wherein an agent for the acid oxidization treatment comprises nitric acid, sulfuric acid or a combination thereof.

7. The valuable metal selectively adsorbing electrode as claimed in claim 5, wherein after the acid oxidization treatment, the carbon-containing material is further subjected to an amidation treatment.

8. The valuable metal selectively adsorbing electrode as claimed in claim 7, wherein an agent for the amidation treatment comprises 1-Ethyl-3-(3-dimethylaminopropyl) carbodiimide hydrochloride (EDAC) and/or N-hydroxysuccinimide (NHS).

9. The valuable metal selectively adsorbing electrode as claimed in claim 8, wherein the agent for the amidation treatment further comprises 2-morpholino-ethanesulfonic acid (MES) or monopotassium phosphate ($KH_2PO_4$).

10. The valuable metal selectively adsorbing electrode as claimed in claim 1, wherein the bacterium of genus *Tepidimonas* comprises *Tepidimonas fonticaldi*.

11. The valuable metal selectively adsorbing electrode as claimed in claim 1, wherein the bacterium of genus *Tepidimonas* is *Tepidimonas fonticaldi* sp. nov.) BCRC 80391.

12. The valuable metal selectively adsorbing electrode as claimed in claim 11, wherein the carbon-containing material is carbon fiber cloth.

13. The valuable metal selectively adsorbing electrode as claimed in claim 12, wherein the carbon-containing material is subjected to an acid oxidization treatment and an amidation treatment after the acid oxidization treatment to promote the immobilization of the protein of a bacterium of genus *Tepidimonas*.

14. The valuable metal selectively adsorbing electrode as claimed in claim 13, wherein an agent for the acid oxidization treatment comprises nitric acid, sulfuric acid or a combination thereof.

15. The valuable metal selectively adsorbing electrode as claimed in claim 13, wherein an agent for the amidation treatment comprises 1-Ethyl-3-(3-dimethylaminopropyl) carbodiimide hydrochloride (EDAC) and N-hydroxysuccinimide (NHS).

16. The valuable metal selectively adsorbing electrode as claimed in claim 15, wherein the agent for the amidation treatment further comprises 2-morpholino-ethanesulfonic acid (MES).

17. The valuable metal selectively adsorbing electrode as claimed in claim 11, wherein the valuable metal is gold.

18. A method for selectively recovering a valuable metal, comprising:
(a) bringing a liquid containing a valuable metal into contact with a valuable metal selectively adsorbing electrode, wherein the valuable metal selectively adsorbing electrode comprises:
an electrode formed by a carbon-containing material; and
a protein of a bacterium of genus *Tepidimonas* immobilized on the electrode formed by a carbon-containing material to form the valuable metal selectively adsorbing electrode, wherein the protein of a bacterium of genus *Tepidimonas* has an effect of selectively adsorbing a valuable metal, and wherein the carbon-containing material is subjected to an acid oxidization treatment to promote the immobilization of the protein of a bacterium of genus *Tepidimonas*; and
(b) applying a voltage to the valuable metal selectively adsorbing electrode to allow the valuable metal in the liquid containing a valuable metal to adsorb to the valuable metal selectively adsorbing electrode,
wherein the valuable metal comprises gold, palladium, silver or indium.

19. The method for selectively recovering a valuable metal as claimed in claim 18, wherein the carbon-containing material comprises carbon fiber cloth, activated carbon fiber cloth, activated carbon, carbon nanotube (CNT) or graphene.

20. The method for selectively recovering a valuable metal as claimed in claim 18, wherein the electrode formed by a carbon-containing material comprises a collector plate for immobilizing the carbon-containing material thereon.

21. The method for selectively recovering a valuable metal as claimed in claim 20, wherein the carbon-containing material activated carbon, carbon nanotube (CNT) or graphene.

22. The method for selectively recovering a valuable metal as claimed in claim 18, wherein an agent for the acid oxidization treatment comprises nitric acid, sulfuric acid or a combination thereof.

23. The method for selectively recovering a valuable metal as claimed in claim 18, wherein after the acid oxidization treatment, the carbon-containing material is further subjected to an amidation treatment.

24. The method for selectively recovering a valuable metal as claimed in claim 23, wherein an agent for the amidation treatment comprises 1-Ethyl-3-(3-dimethylaminopropyl) carbodiimide hydrochloride (EDAC) and/or N-hydroxysuccinimide (NHS).

25. The method for selectively recovering a valuable metal as claimed in claim 24, wherein the agent for the amidation treatment further comprises 2-morpholino-ethanesulfonic acid (MES) or monopotassium phosphate ($KH_2PO_4$).

26. The method for selectively recovering a valuable metal as claimed in claim 18, wherein the bacterium of genus *Tepidimonas* comprises *Tepidimonas fonticaldi*.

27. The method for selectively recovering a valuable metal as claimed in claim 18, wherein the bacterium of genus *Tepidimonas* is *Tepidimonas fonticaldi* sp. nov.) BCRC 80391.

28. The method for selectively recovering a valuable metal as claimed in claim 27, wherein the carbon-containing material is carbon fiber cloth.

29. The method for selectively recovering a valuable metal as claimed in claim 28, wherein the carbon-containing material is subjected to an acid oxidization treatment and an amidation treatment after the acid oxidization treatment to promote the immobilization of the protein of a bacterium of genus *Tepidimonas*.

30. The method for selectively recovering a valuable metal as claimed in claim 29, wherein an agent for the acid oxidization treatment comprises nitric acid, sulfuric acid or a combination thereof.

31. The method for selectively recovering a valuable metal as claimed in claim 29, wherein an agent for the amidation treatment comprises 1-Ethyl-3-(3-dimethylaminopropyl) carbodiimide hydrochloride (EDAC) and N-hydroxysuccinimide (NHS).

32. The method for selectively recovering a valuable metal as claimed in claim 31, wherein the agent for the amidation treatment further comprises 2-morpholino-ethanesulfonic acid (MES).

33. The method for selectively recovering a valuable metal as claimed in claim 27, wherein the valuable metal is gold.

34. The method for selectively recovering a valuable metal as claimed in claim 18, wherein the voltage is about 0.5-2.0 V.

35. The method for selectively recovering a valuable metal as claimed in claim 18, wherein the voltage is about 1 V.

36. The method for selectively recovering a valuable metal as claimed in claim 18, wherein the voltage is applied for about 5-30 minutes.

37. The method for selectively recovering a valuable metal as claimed in claim 18, wherein the voltage is applied for about 15 minutes.

38. The method for selectively recovering a valuable metal as claimed in claim 18, wherein a concentration of valuable metal of the liquid containing a valuable metal is about 1-100 mg/L.

39. The method for selectively recovering a valuable metal as claimed in claim 18, further comprising, after step (b), desorbing the valuable metal which is adsorbed on the valuable metal selectively adsorbing electrode from the valuable metal selectively adsorbing electrode.

* * * * *